United States Patent
Holtmanns et al.

(10) Patent No.: US 9,948,628 B2
(45) Date of Patent: Apr. 17, 2018

(54) METHOD FOR ENABLING LAWFUL INTERCEPTION BY PROVIDING SECURITY INFORMATION

(71) Applicant: Nokia Technologies Oy, Espoo (FI)

(72) Inventors: Silke Holtmanns, Klaukkala (FI); Gabor Ungvari, Gyál (HU)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/760,842

(22) PCT Filed: Feb. 7, 2013

(86) PCT No.: PCT/IB2013/051029
§ 371 (c)(1),
(2) Date: Jul. 14, 2015

(87) PCT Pub. No.: WO2014/122502
PCT Pub. Date: Aug. 14, 2014

(65) Prior Publication Data
US 2016/0006713 A1    Jan. 7, 2016

(51) Int. Cl.
*H04L 29/06* (2006.01)
*H04L 9/08* (2006.01)

(52) U.S. Cl.
CPC .......... *H04L 63/08* (2013.01); *H04L 9/0838* (2013.01); *H04L 63/0428* (2013.01); *H04L 63/30* (2013.01); *H04L 63/306* (2013.01); *H04L 2209/80* (2013.01)

(58) Field of Classification Search
None
See application file for complete search history.

(56) References Cited

U.S. PATENT DOCUMENTS

2006/0245595 A1* 11/2006 Bell ............... H04L 63/061
                                                380/278
2007/0086591 A1*  4/2007 Blom ............. H04L 63/0435
                                                380/279
2007/0297418 A1   12/2007 Lee
(Continued)

FOREIGN PATENT DOCUMENTS

GB        2423220 A      8/2006
WO        03049357 A2    6/2003
(Continued)

OTHER PUBLICATIONS

3GPP TS 33.220 V6.13.0, "3rd Generation Partnership Project; Technical Specification Group Services and System Aspects;Generic Authentication Architecture (GAA);Generic bootstrapping architecture(Release 6)", Jun. 2007.*
(Continued)

*Primary Examiner* — Henry Tsang
(74) *Attorney, Agent, or Firm* — Mintz Levin Cohn Ferris Glovsky and Popeo, P.C.

(57) ABSTRACT

A method and apparatus are provided. Information associated with a lawful interception of communication data of a user equipment is received. Security information associated with the communication data of the user equipment is provided in response to the received information. The security information is based on a first secret which is shared between a communication network provider and the user equipment.

17 Claims, 6 Drawing Sheets

(56) References Cited

U.S. PATENT DOCUMENTS

| | | |
|---|---|---|
| 2009/0182668 A1 | 7/2009 | Lee |
| 2010/0002880 A1* | 1/2010 | Yoon .................. H04L 12/66 |
| | | 380/255 |
| 2011/0154181 A1* | 6/2011 | Kawa .................. H04L 63/00 |
| | | 715/234 |

FOREIGN PATENT DOCUMENTS

| | | |
|---|---|---|
| WO | WO-2007023286 A1 | 3/2007 |
| WO | 2007042345 A1 | 4/2007 |

OTHER PUBLICATIONS

International Search Report and Written Opinion received for corresponding Patent Cooperation Treaty Application No. PCT/IB2013/051029, dated Feb. 3, 2014, 14 pages.

ETSI, "ETSI TS 133 107 V11.3.0 Universal Mobile Telecommunications System (UMTS); LTE; 3G security; Lawful interception architecture and functions", GPP Standard, 3GPP TS 33.107, V 11.3.0, Release 11, 650 Route Des Lucioles, F-06921 Sophia Antipolis, Cedex, France. Oct. 2012.

"3rd Generation Partnership Project; Technical Specification Group Services and System Aspects; Generic Authentication Architecture (GAA); Generic Bootstrapping Architecture (Release 6)", GPP Standard, 3GPP TS 33.220 v 1.1.0. 3GPP TSG SA WG3 Security S3#32, Edinburgh, Scotland, UK, Feb. 2004.

* cited by examiner

METHOD FOR ENABLING LAWFUL INTERCEPTION BY PROVIDING SECURITY INFORMATION

RELATED APPLICATION

This application was originally filed as Patent Cooperation Treaty Application No. PCT/IB2013/051029 filed Feb. 7, 2013.

FIELD OF INVENTION

The present application related to lawful interception and in particular but not exclusively to the lawful interception of data communicated between a user equipment and an application server.

BACKGROUND

A communication system can be seen as a facility that enables communications between two or more entities such as a communication device, e.g. mobile stations (MS) or user equipment (UE), and/or other network elements or nodes, e.g. Node B or base transceiver station (BTS), associated with the communication system. A communication system typically operates in accordance with a given standard or specification which sets out what the various entities associated with the communication system are permitted to do and how that should be achieved.

Wireless communication systems include various cellular or otherwise mobile communication systems using radio frequencies for sending voice or data between stations, for example between a communication device and a transceiver network element. Examples of wireless communication systems may comprise public land mobile network (PLMN), such as global system for mobile communication (GSM), the general packet radio service (GPRS), the universal mobile telecommunications system (UMTS) or WiFi.

A mobile communication network may logically be divided into a radio access network (RAN) and a core network (CN). The core network entities typically include various control entities and gateways for enabling communication via a number of radio access networks and also for interfacing a single communication system with one or more communication systems, such as with other wireless systems, such as a wireless Internet Protocol (IP) network, and/or fixed line communication systems, such as a public switched telephone network (PSTN). Examples of radio access networks may comprise the UMTS terrestrial radio access network (UTRAN) and the GSM/EDGE radio access network (GERAN).

A user equipment or mobile station may be provided with access to applications supported by the core network via the radio access network, but potentially also via other networks. The core network may provide functionality to authenticate a user or other support the security of communication between an user equipment and an application. This functionality may be provided for example by a generic bootstrapping architecture.

A requirement of some networks is the provision of lawful interception capabilities. Since communication technology advances, the lawful interception becomes also relevant in general service context. IP based communication services e.g. video or voice are also relevant from lawful interception perspective. In lawful interception, communication data on the network is intercepted and provided to a lawful authority. The lawful authority can analyse the data with regards to any lawful issues that may arise.

SUMMARY OF INVENTION

According to a first aspect, there is provided a method comprising: receiving information associated with a lawful interception of communication data of a user equipment; and providing security information associated with the communication data of the user equipment in response to the received information; wherein the security information is based on a first secret which is shared between a communication network provider and the user equipment.

The security information may comprise a second secret shared between a credentials server and the user equipment, said second secret being based on the first secret. The received information may comprise an identity of the communication data to be intercepted. The received information may comprise at least one of: an identity of the user equipment; an identity of an application server; and an identity of a type of communication. The communication data of the user equipment may be communication data between the user equipment and an application server.

Providing security information may further comprise: generating an interception related information report comprising the security information; and sending the interception related information report to a lawful interception entity.

The second secret may comprise a key for the encryption of communication between the user equipment and an application server. The key may be at least one of: a symmetric key and an application specific key.

According to a second aspect, there may be provided an apparatus comprising: receiving means for receiving information associated with a lawful interception of communication data of a user equipment; and providing means for providing security information associated with the communication data of the user equipment in response to the received information; wherein the security information is based on a first secret which is shared between a communication network provider and the user equipment.

The security information may comprise a second secret shared between a credentials server and the user equipment, said second secret being based on the first secret. The received information may comprise an identity of the communication data to be intercepted.

The received information may comprise at least one of: an identity of the user equipment; an identity of an application server; and an identity of a type of communication. The communication data of the user equipment may be communication data between the user equipment and an application server.

The providing means may be further configured to generate an interception related information report comprising the security information and send the interception related information report to a lawful interception entity. The second secret may comprise a key for the encryption of communication between the user equipment and an application server. The key may be at least one of: a symmetric key; and an application specific key. The apparatus may be one of a credentials server and an application server.

According to a third aspect, there is provided a computer program product, comprising program instructions, when executed, performing the steps of: receiving information associated with a lawful interception of communication data of a user equipment; and providing security information associated with the communication data of the user equipment in response to the received information; wherein the security information is based on a first secret which is shared between a communication network provider and the user equipment.

According to a fourth aspect, there is provided a method comprising: sending information associated with a lawful interception of communication data of a user equipment; and receiving security information associated with the communication data of the user equipment in response to the sent information; wherein the security information is based on a first secret which is shared between a communication network provider and the user equipment.

The security information may comprise a second secret shared between a credentials server and the user equipment, said second secret being based on the first secret. The sent information may comprise an identity of the communication data to be intercepted. The communication data of the user equipment may be communication data between the user equipment and an application server.

According to a fifth aspect, there is provided an apparatus comprising: sending means for sending information associated with a lawful interception of communication data of a user equipment; and receiving means for receiving security information associated with the communication data of the user equipment in response to the sent information; wherein the security information is based on a first secret which is shared between a communication network provider and the user equipment.

The apparatus may be a lawful interception network entity.

According to a sixth aspect, there is provided a computer program product, comprising program instructions, when executed, performing the steps of: sending information associated with a lawful interception of communication data of a user equipment; and receiving security information associated with the communication data of the user equipment in response to the sent information; wherein the security information is based on a first secret which is shared between a communication network provider and the user equipment.

According to a seventh aspect, there is provided an apparatus comprising at least one processor and a memory, the processor and the memory configured to: receive information associated with a lawful interception of communication data of a user equipment; and provide security information associated with the communication data of the user equipment; wherein the security information is based on a first secret which is shared between a communication network provider and the user equipment.

According to an eighth aspect, there is provided an apparatus comprising at least one processor and a memory, the processor and the memory configured to: send information associated with a lawful interception of communication data of a user equipment; and receive security information associated with the communication data of the user equipment; wherein the security information is based on a first secret which is shared between a communication network provider and the user equipment.

DESCRIPTION

Communication of data between an user equipment and an application server in a telecommunications network may be encrypted or otherwise secured in order to prevent unauthorised access to the data. The generic bootstrapping architecture (GBA) is a generic security enabler that may provide an application server and an user equipment with such security association. The GBA functionality may provide shared secrets to the user equipment and application server based on the cellular credentials of the user equipment and/or application server. The shared secret may be derived in the GBA credential server (BSF) and in the UE. The shared secret may then be used by the user equipment and application server to protect communications, service security, data, media and/or be used for authentication or authorisation.

In GBA, a GBA credential server, for example a bootstrapping server function (BSF) may be set up to facilitate authentication of an UE and provide a shared secret to an application server. The security association is based on cellular credentials or other type of pre-agreed credentials (like SIP Digest credentials). As the BSF is generic, it may be used by multiple users for a plurality of communication security services. The BSF may authenticate a user by using a valid identity of the user registered to a home location register (HLR) or a home subscriber server (HSS). The BSF may then trigger the establishment of a shared secret in the UE and provide the application server with the shared secret which may be used for securing the communication between the application server and user equipment.

Lawful interception (LI) is the legally authorised process by which a law enforcement agency may be given access to data communicated on a telecommunications network. The data may be intercepted and provided to a law enforcement agency for analysis or further action. In order for any meaningful analysis of such data to be made, encrypted data should be decrypted for analysis. However secured communication between nodes in a network may be set up so that only the addressed recipient of the data may decrypt it.

Embodiments of the present application may provide a method for data secured using the generic bootstrapping architecture to be lawfully intercepted with the ability to decrypt the data.

Figure 1:
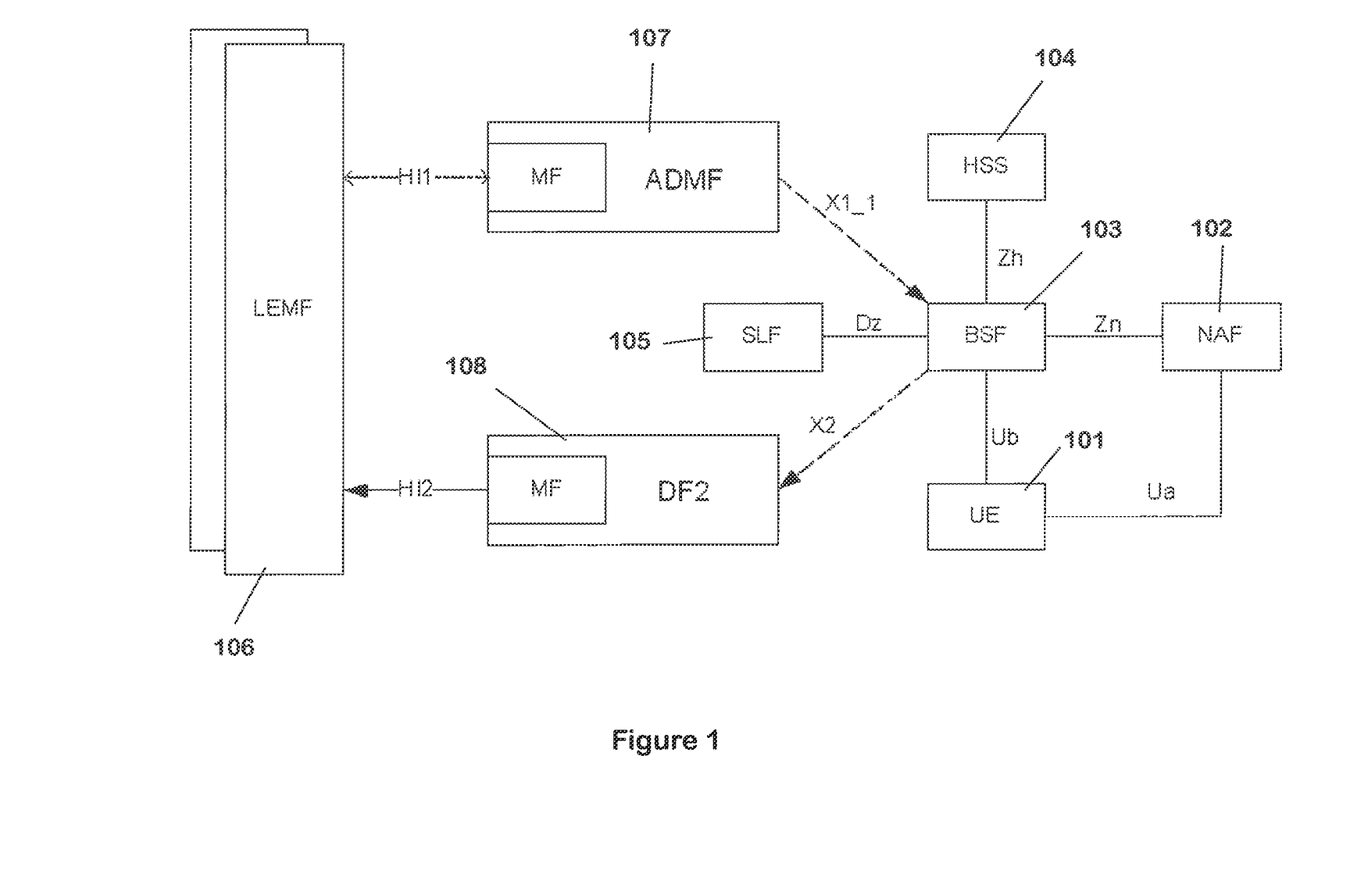
FIG. 1 is a schematic diagram of a network in accordance with a first embodiment.

FIG. 1 shows an example of a network with lawful interception and generic bootstrapping architecture functionality. FIG. 1 only comprises those features of a network used in the description of embodiments and it will be appreciated that the network shown in FIG. 1 may comprise further components used to provide communication service. For example, while a base station or Node B is not shown in FIG. 1, it will be appreciated that the network may comprise such functionality.

FIG. 1 comprises a user equipment (UE) 101 and a network application function (NAF) 102. The NAF 102 may be an application server and may be configured to communicate with the UE 101 over an interface, for example a Ua interface. The NAF 102 may provide a service or other data to the UE 101 or a further network node associated with the UE 101. The NAF 102 may be a service provided to the UE 101, for example the NAF 102 may provide for example, mobile TV, authorisation, single sign on, authentication, credentials for peer-to-peer communications, etc. It will be appreciated that only some of these services may be of interest for lawful interception.

The communication between the UE 101 and NAF 102 may be secured using a shared secret in accordance with the generic bootstrapping architecture (GBA).

In accordance with the GBA, a bootstrapping server function (BSF) 103 is provided. The BSF 103 may form part of the core network. The BSF 103 may be able to communicate with the UE 101 over an interface Ub and with the NAF 102 over an interface Zn or Zn' in some embodiments. The BSF 103 may be configured to authentication the UE 101 using cellular information, for example information relating to the subscriber identity module (SIM) card or universal integrated circuit card (UICC) of a UE 101. The BSF 103 may make use of a home subscriber server (HSS) 104 and/or a subscriber location function (SLF) 105 to authenticate the cellular information of the UE 101.

The Generic Bootstrapping Architecture (GBA) is a generic security enabler that provides an application server and a UE with one or more shared secrets based on the cellular credentials. This secret can be used to protect communications, data, media or used for authentication or authorization. Once a GBA credential server is set up for one purpose in the operator network, it can be used for many other communication security services as well (it is a generic security enabler). A example of the GBA architecture is defined in the 3GPP TS 33.220.

In the generic bootstrapping architecture, a UE may initiate contact with a NAF, for example the UE may desire to make use of a service provided by the NAF. In order for secure communication to be carried out between the UE and the NAF, a security association between the UE and the NAF is generated. In order to generate this association, the UE maybe be authenticated with a BSF.

This authentication may make use of information inherent to the UE. For example the authentication may take place using an identity of the UE and information such as SIM information. The BSF may have access to this information via a home subscriber server and/or subscriber location register network entities.

If the UE is successfully authenticated, the UE and the BSF may generate a key in parallel. It will be appreciated that the key generated by the BSF and the key generated by the UE will be the same as the same data (for example SIM information) is used to generate the key in each entity. The key may be based on a shared secret. In this example, the shared secret may correspond to SIM information. By using a shared secret, a communication of the key need not be carried between the UE and the BSF or the UE and the NAF.

The BSF may then provide the key to the NAF, where it is used for communication between the UE and the NAF.

While embodiments of the present application are described in relation to the generic bootstrapping architecture, it will be appreciated that other shared secret security systems may be used. For example such systems may provide a first shared secret between a user equipment and a communications network provider. This first shared secret may be for example SIM information. A credentials server may then facilitate the authentication of a user equipment based on this first shared secret. The credentials sever and UE may use the first shared secret to generate a second shared secret. This second secret may be for example a symmetric key and may be used by the UE and a NAF to encrypt communication between the UE and the NAF. It will be appreciated that the credentials server and the UE may generate the second shared secret in parallel based on the first shared secret. The security information for the encryption of communication between the UE and the NAF may therefore be based on the first shared secret.

The network of FIG. 1 may further be provided with lawful interception capabilities. In FIG. 1 a law enforcement monitoring facility (LEMF) 106 may be provided. The LEMF 106 may monitor and store lawfully intercepted data in some embodiments. In some embodiments, the LEMF 106 may receive security information associated with lawful interception and use the security information to decrypt lawfully intercepted data or provide the security information to a further server or entity.

The LEMF 106 may send and receive data to and from a first network entity 107 which may carry out administrative or control functions with respect to lawful interception and a second network entity 108 which may provide the delivery of lawfully intercepted content. In some embodiments, the LEMF 106 may communicate with the first entity 107 via a first handover interface HI1 and with the second entity 108 via a second handover interface HI2.

In operation, the LEMF 106 may indicate an identity of a service and/or user to be monitored to the first network entity 107. The first network entity 106 may use this indicated information to instruct a further network entity to intercept data relating to the identified service and/or user and provide it to the LEMF 106. In some embodiments this indication takes the form of identifying a trigger in response to which data should be intercepted.

The second network entity 108 may receive intercepted data in response to the trigger and deliver the intercepted data to the LEMF 106. It will be appreciated that while the first and second network entities have been describes as separate entities, they may be co-located or form part of a single network entity in some embodiments.

It will be appreciated that while FIG. 1 has been described as a network, not all the entities in FIG. 1 may be within a single network domain. For example, the NAF 102 may be external to a network of the UE 101. Additionally, the law enforcement monitoring facility may be external to the network in some embodiments.

In some embodiments, the LEMF 106 may lawfully intercept data by indicating to network entities involved in communication which information is to be intercepted. For example, the LEMF 106 may provide a user identifier and optionally a service identity for which communication is to be intercepted. In some embodiments, data may be intercepted on the Ua interface. The Ua interface may run over cellular, but may also run over fixed or other type of networks. In some embodiments, data may be intercepted by node in the network such as a gateway GPRS support node (GGSN) and serving GPRS support node (SGSN) for example. For example the first network entity 107 may provide and identity of data to be intercepted to the GGSN and/or SSGN and these nodes may provide intercepted data to the second network entity 108.

If the intercepted data from a network node (for example a GGSN and/or SSGN) is secured in accordance with the generic bootstrapping architecture however, the LEMF 106 will not be able to decrypt the intercepted data. FIG. 1 shows an example where the LEMF 106 may access security information from the BSF 103 in order to decrypt intercepted data.

In the embodiment of FIG. 1, the first network entity 107 may communicate with the BSF 103 via and X1_1 interface. The first network entity 107 may provide trigger information to the BSF 103. In some embodiments this trigger information may identify which data or information is of interest for lawful interception. The information may identify a service and/or user identity. The information communicated from the first network entity 107 may be configured to trigger the reporting of security information from the BSF 103 associated with the identified service and/or user identity for data will be lawfully intercepted.

For example, triggering information from the first network entity 107 containing an identity of a user may trigger the reporting of one or more cryptographic keys and related information e.g. key lifetime, key identifier, service the key relates to associated with the identified user.

The triggering information may comprise one or more of an identity of a user, identity of a service or NAF 102 and/or the type of event to trigger the reporting.

The user identity in the triggering information may be for example an international mobile subscriber identity (IMSI) or Mobile Subscriber Integrated Services Digital Network-Number (MSISDN) of the user. In some embodiments, the BSF 103 may map the user identity received in the triggering information to a HSS or SLF to identify the user.

For example, the reporting of cryptographic information may be triggered when a user accesses the BSF 103 to generate an application specific key Ks_(ext/int)_NAF. The key may be application specific in that it is generated for communication between the user and a specified NAF 102. When this key generation occurs, the BSF 103 may be triggered to report security information to the LEMF 106. It will be appreciated that this is by way of example only and reporting may alternatively or additionally be triggered in response to any modification, generation or management of the key or security information. For example, reporting may be triggered when an NAF 102 request a GBA key from the BSF. The resultant IRI may include and identity of the NAF 102 communicating with the UE 101. In this case the LEMF 106 may be made aware of which service a user is communicating with. In some cases, where the NAF 102 is external to the network, the LEMF 106 may not have access to this information otherwise.

In some embodiments, the reporting may comprise the generation of a lawful interception intercept related information (IRI). This may be for example the encrypted related parameters and information related to the encryption of content between the UE 101 and NAF 102. In some embodiments, the IRI may comprise information to enable the LEMF 106 or associated entity to decrypt the intercepted encrypted data.

The BSF 103 may filter the information in the IRI before sending it. For example, the BSF may filter whether the LEMF 106 requires all GBA keys associated with a user or just the keys associated with a specific NAF 102. The triggering information received by the BSF 103 from the LEMF 106 may have identified which service types are of interest. In other words, the list of services for which an IRI is triggered may be pre-configured in the BSF 103. This list might be country dependent. In other embodiments, the LEMF 106 may require all keys associated with a user to be included in the IRI.

In some embodiments, a GBA key may have already been generated for a user by the time triggering information is received from the first network entity 107. In this case, the reporting of IRI may be immediately triggered to provide the key being used by the user. In some embodiments, the BSF 103 does not store all parameters associated with a user key. However, the BSF may re-generate the user's key based on a master key from which all application specific keys are derived.

The IRI may be provided to the second network entity 108. In some embodiments, the IRI may be provided via an X2 interface between the BSF 103 and the second network entity 108. This second network entity 105 and X2 interface may provide a intercept related information delivery path to the LEMF 106. The second network entity 108 may then provide the IRI to the LEMF 106.

Figure 2:
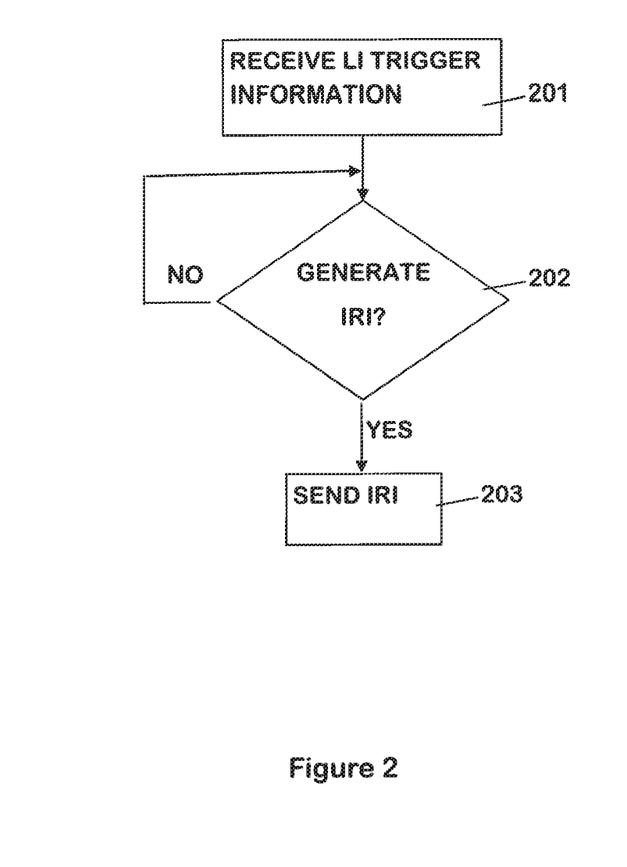
FIG. 2 is a flow diagram depicting method steps in accordance with a first environment.

FIG. 2 shows an example of a flow diagram of the method steps carried out in some embodiments.

At step 201, the BSF 103 may receive triggering information from the LEMF 106. This triggering information may be received from a first network entity 107 associated with the LEMF 106 over an X1_1 interface. The triggering information may contain for example at least one of an identity of a user, an identity of one or more services and a type of trigger event.

At step 202 the BSF 103 determines whether intercept related information (IRI) should be generated. If it is determined that an IRI should be generated, for example, an identified user has already been generated a key and/or a request for key generation or management has been received from a user and/or NAF 102, the method proceeds to 203. At step 203, the generated IRI is sent.

If it is determined that an IRI should not be generated, for example if the triggering conditions are not met, the BSF 103 continues to monitor requests from the UE 101 and NAF 102 until the triggering conditions are satisfied and an IRI is generated.

FIGS. 1 and 2 show embodiments relating to the provision of security information from a BSF 103 of a generic bootstrapping architecture to a lawful interception entity. It will be appreciated that in some embodiments, security information may be in addition provided by the NAF 102 to the LEMF 106. In these embodiments, interfaces may be provided between the NAF 102 and the first and second network entities 107 and 108.

The above has described the lawful interception of security information such as key information by the LEMF 106. It will be appreciated that the lawful interception of content of the communication also takes place. For example, while the security information is lawfully intercepted from the BSF 103 and, in some embodiments, the NAF 102, content of the communication between the UE 101 and NAF 102 is also intercepted.

In some embodiments this interception may take place on the Ua interface between the UE 101 and NAF 102. For example, communication may be intercepted by GGSN and/or and SSGN and provided to the LEMF 106 via the second network entity 108. In other embodiments, the NAF 102 may carry out the lawful interception of data between the UE 101 and NAF 102.

Figure 4:
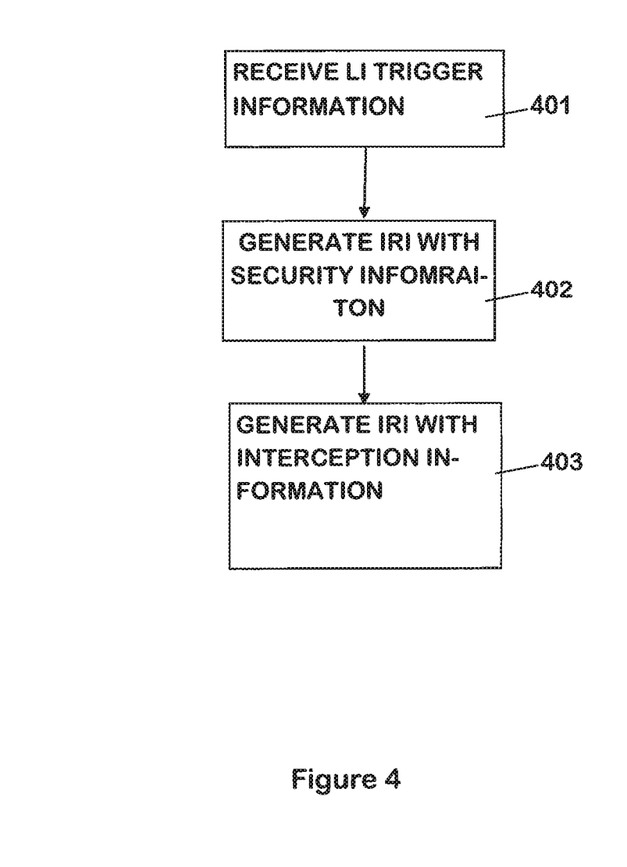
FIG. 4 is a flow diagram depicting method steps in accordance with a second environment.
Figure 5:
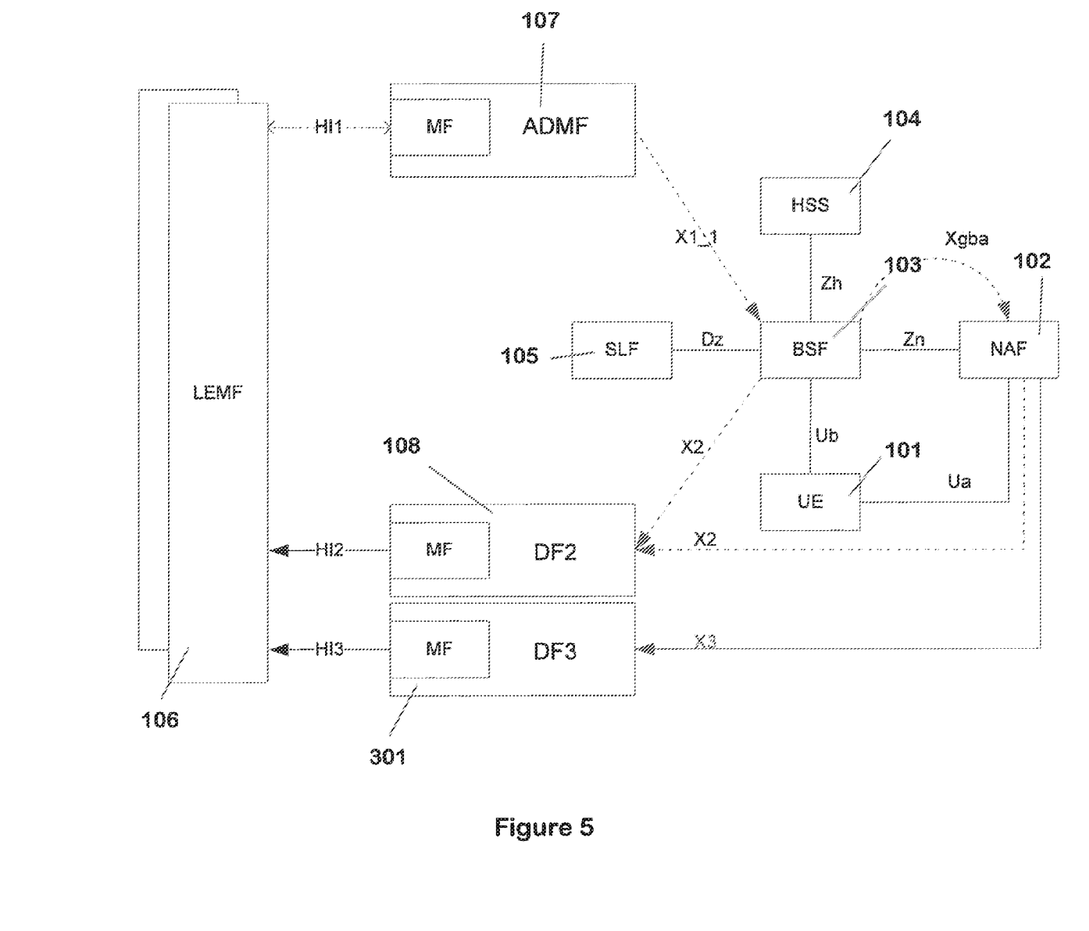
FIG. 5 is a schematic diagram of a network in accordance with a third embodiment.
Figure 6:
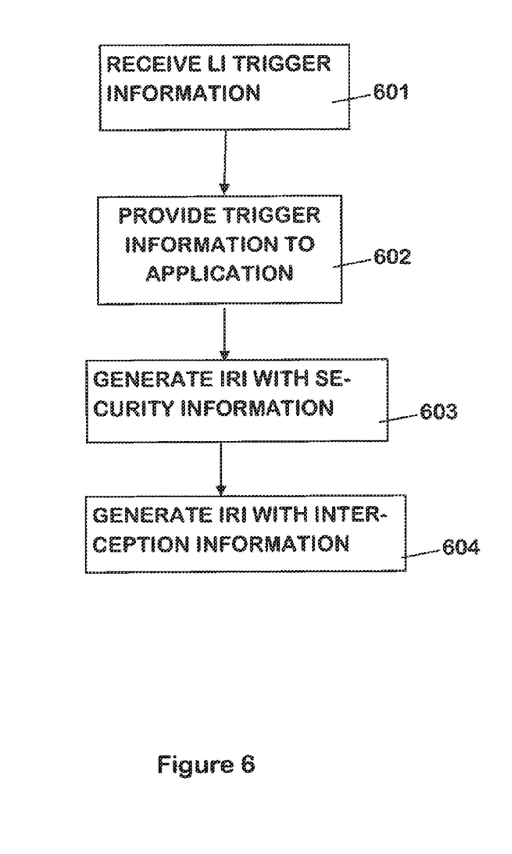
FIG. 6 is a flow diagram depicting method steps in accordance with a third environment.

FIGS. 4 to 6 show examples of the NAF 102 carrying out interception of the data.

In a further embodiment, triggering information may be provided from the first lawful interception network entity to the NAF in addition to providing this triggering information to the BSF. The triggering information may indicate to the NAF which security information is to be reported. Additionally or alternatively, the triggering information may indicate which information is to be intercepted. The data of the communication between a UE and NAF may be intercepted at the NAF and the NAF may generate IRI reports for the lawful interception entities. In this case, the data communication need not be intercepted on the Ua interface however it will be appreciated that in some embodiments, interception may be carried out on the Ua interface (for example via a SSGN/GGSN) as well as at the NAF.

Figure 3:
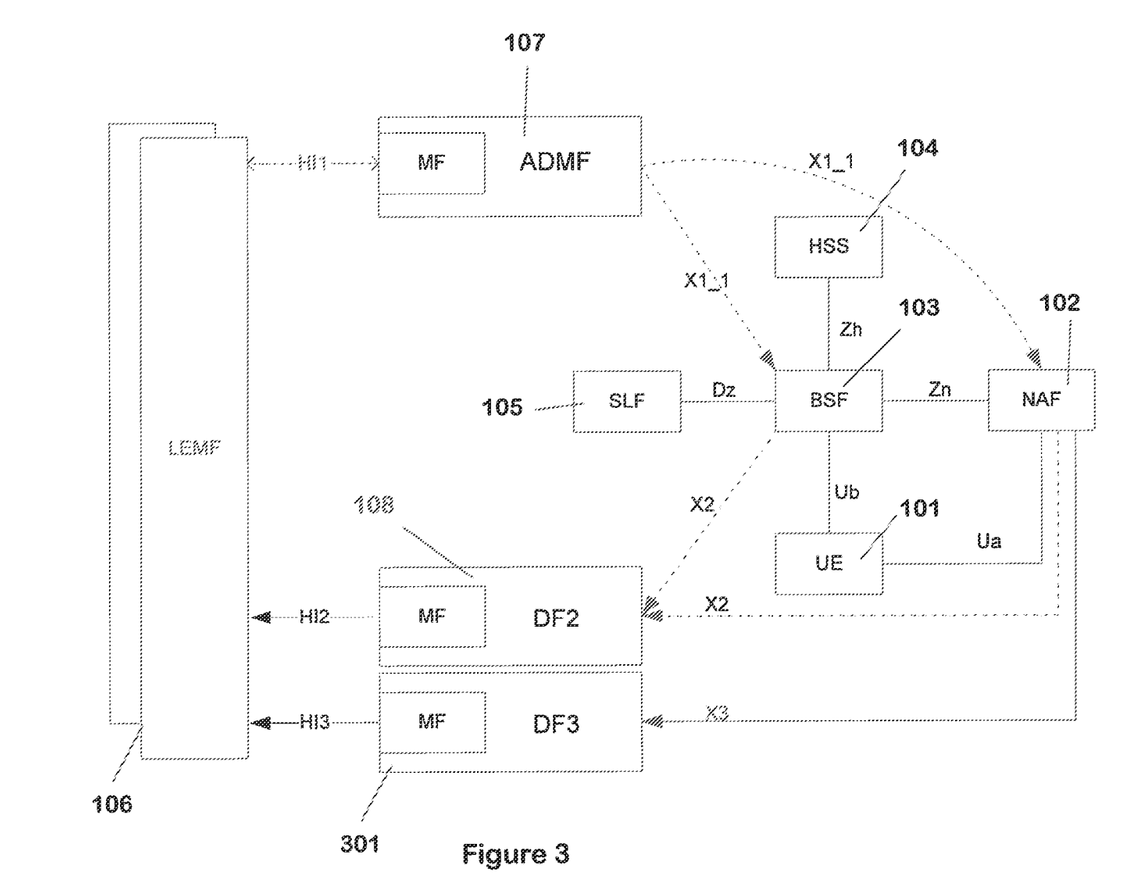
FIG. 3 is a schematic diagram of a network in accordance with a second embodiment.

FIG. 3 shows an example of a network in which the NAF is configured to report security information and/or data communication to a lawful interception entity. It will be appreciated that the network of FIG. 3 may be similar to that of FIG. 1 and that like numerals have been used to describe like.

The network of FIG. 3 comprises a UE 101, NAF 102, BSF 103, SLF 105 and HSS 104. Additionally the network comprises a LEMF 106, a first lawful interception (LI) network entity 107, a second LI network entity 108 and a third LI network entity 301.

The first LI network entity 107 may be configured to provide LI control information to other entities of the network. The control information may include to information relating to when a lawful interception report is to be generated, an identity of user for which information is to be intercepted, an identity of a service and/or a type of information to be intercepted.

The second LI entity 108 may be configured to receive security information relating to the communication between the UE 101 and the NAF 102 to be intercepted. The second LI entity may further provide this information to the LEMF 106. This information may be for example in the form of an LI IRI and include information such as keys, security parameters and/or other information that may allow the LEMF 106 or associated entity to decrypt intercepted communication.

The third LI entity 301 may be configured to receive intercepted communications, for example intercepted communication between the UE 101 and NAF 102. Third LI entity 301 may information such as the intercepted communication via an X3 interface. The third LI entity 301 may be further configured to provide the intercepted communication to the LEMF 106.

In the embodiment of FIG. 3, in addition to providing triggering information to the BSF 103, the first LI network entity 107 may provide triggering information to the NAF 102. The NAF 102 may be an application server with which a user is communicating, for example, the UE 101 may be communicating with the NAF 102 via the interface Us. The NAF 102 may identify which security information and which data communication is of interest to the LEMF 106 based on the triggering information. For example, the NAF 102 may use an identity of the user or type of communication to identify and provide a key or other security information associated with that user to the LEMF 106. This information may be provided to the second LI network entity 108.

The NAF 102 may also identify the data communication between the NAF 102 and the UE 101. The NAF 102 may then intercept the identified data communication and provide it to the third LI network entity 301. The intercepted data communication may be provided over an X3 interface.

In the embodiments of FIG. 3, both the BSF 103 and the NAF 102 may provide security information to the LEMF 106. The BSF 103 and NAF 102 may both be in communication with the first LI network entity 107 to receive trigger information and may both be in communication with the second LI network entity 108 to provide the security information. The NAF 102 may further be configured to intercept data communication and be in communication with the third LI network entity 301 to provide the intercepted data communication.

FIG. 4 shows an example of the method step that may be carried out in accordance with this embodiment.

At step 401, trigger information is received. This information may be received from the first LI network entity 107. It will be appreciated that both the BSF 103 and the NAF 102 may receive this information.

At step 402, one or more IRI reports are generated. The reports may include security information identified by the trigger information received at step 401. The reports may be generated by both the BSF 103 and NAF 102. In some embodiments however, the trigger information may identify the type of security information to be sent and it may be determined which of the BSF 103 and/or NAF 102 is to generate the IRI report. The one or more IRI reports may be sent to the second LI network entity 108. The reports may be sent for example over the X2 interfaces between the second LI network entity 108 and the BSF 103 and NAF 102.

At step 403 a further IRI report containing information relating to intercepted data may be generated. The NAF 102 may intercept communication data based on the trigger information. The NAF 102 may generate an IRI report corresponding to this intercepted information and may send the IRI report to the third LI network entity 301. It will be appreciated that step 403 may be carried out whenever the UE 101 and NAF 102 communicate data identified by the trigger information. For example, in some embodiments, all communication data may be intercepted between the UE 101 and NAF 102 and one or more IRI reports may be generated for this intercepted data.

In the embodiment shown in FIG. 3 both the BSF 103 and the NAF 102 may be provided with LI trigger information and related activation data. The BSF 103 may provide an LI event report about the GBA key generation and key usage events. The NAF may also provide an LI event report about GBA key usage and related application parameters. In some embodiments, the BSF 103 and NAF 102 may be in the same operator domain. In embodiments where the BSF 103 and the NAF 102 are in separate networks and lawful interception is activated in both networks, then the GBA protected communication content can be decrypted with less effort as the GBA keys are provided also from the NAF along with the intercepted content.

FIG. 5 shows a further embodiment of a network. In FIG. 5, the NAF 102 may receive trigger information and generate an IRI report corresponding to security information as well as an IRI report corresponding to intercepted data. However, instead of receiving the trigger information directly from the first LI network entity 107, the NAF may receive the trigger information from the BSF 103.

The network of FIG. 5 comprises UE 101, NAF 102, BSF 103, HSS 104 and SLF 105. The network further comprises LEMF 106, first LI network entity 107, second LI network entity 108 and third LI network entity 301. It will be appreciated that these entities may be similar to the like numbered entities in the foregoing.

In the embodiment of FIG. 5, the BSF 103 may receive trigger information from the first LI network entity 107 and provide IRI report corresponding to security information to the second LI network entity 108. The NAF 102 may receive trigger information and provide an IRI report corresponding to security information to the second LI network entity. The NAF 102 may further intercept communication data and generate and send an IRI report corresponding to intercepted information to the third LI network entity 301.

In the embodiments of FIG. 5, the BSF 103 receives trigger information from the first LI network entity 107 and then provides information corresponding to the trigger information to the NAF 102. This may be provided via an interface between the BSF 103 and the NAF 102. This interface may be for example an Xgba interface.

FIG. 6 shows and example of the method steps carried out in accordance with this embodiment.

At step 601 trigger information is received by the BSF 103. The trigger information may be received from the first LI network entity 107 via the X1_1 interface. The BSF 103 may determine to which service the trigger information refers. At step 702 the BSF may provide information relating to the trigger information to the NAF 102. The information provided to the NAF 102 may be similar to the trigger information received by the BSF 103 in some embodiments. In other embodiments, the BSF 103 may generate a new message including relevant trigger information for the NAF 102.

At step 603, one or more IRI reports may be generated including security information. The one or more IRI reports may be generated by the BSF 103 and the NAF 102 and may be provided to the second LI network entity via an X2 interface.

At step 604, the NAF 102 may intercept the relevant data communication between the UE 101 and the NAF 102 and generate an IRI report corresponding to the generated information.

It will be appreciated that while the NAF 102 has been described as generating both an IRI report containing security information and an IRI report for the intercepted data, in some embodiments, the NAF 102 may be configured to generate only IRI reports for the intercepted data and the LEMF 106 may require the security information from the BSF 103 only.

The embodiments described in relation to FIGS. 5 and 6 introduce an interface between the BSF 103 and the NAF 102 to trigger interception in NAF 102 based on the trigger information. This Xgba interface may trigger the interception in the NAF 102 after GBA keys are requested from the BSF 103. In this embodiment, there may be no need for preliminary lawful interference activation in the NAF 102.

Figure 7:
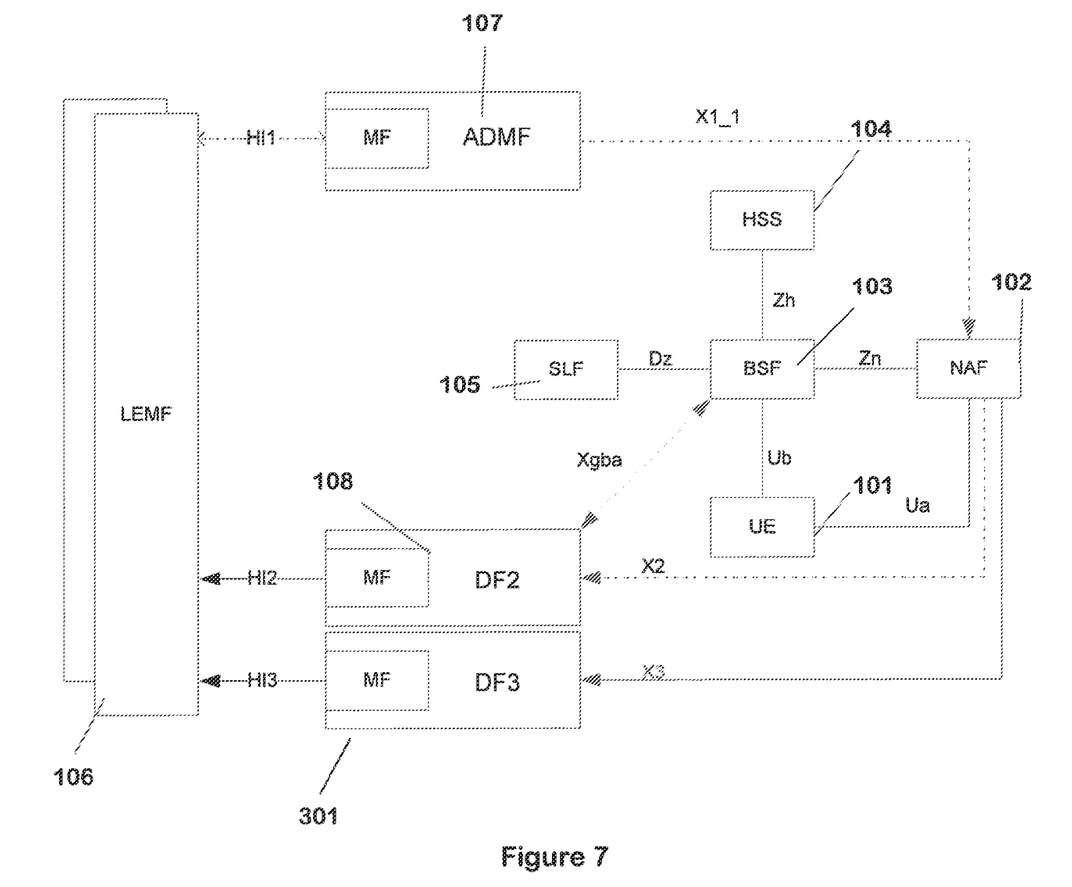
FIG. 7 is a schematic diagram of a network in accordance with a fourth embodiment.
Figure 8:
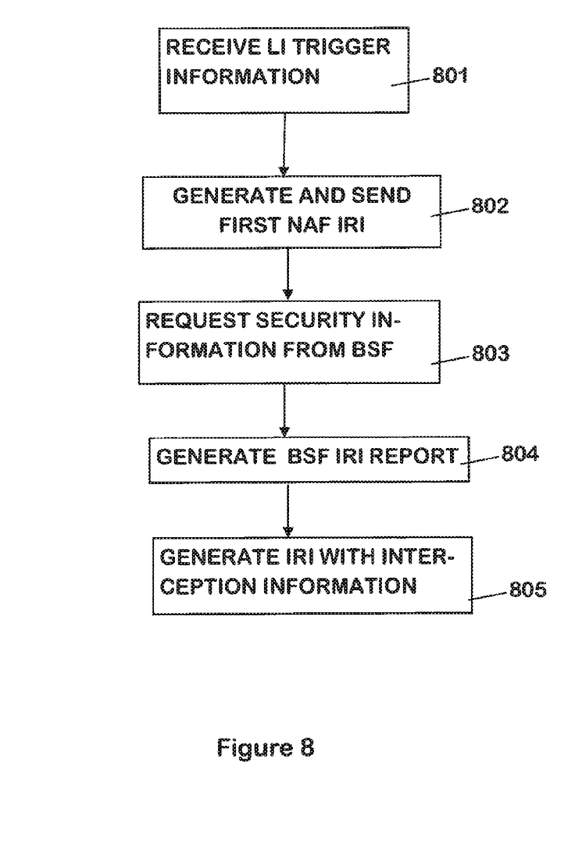
FIG. 8 is a flow diagram depicting method steps in accordance with a fourth environment.

FIGS. 7 and 8 show a further embodiment of a network where triggering information is provided to the NAF 102 instead of the BSF 103. In this case, the NAF 102 may prompt the second LI network entity 108 to request security information from the BSF 103.

The network of FIG. 7 comprises UE 101, NAF 102, BSF 103, HSS 104 and SLF 105. The network further comprises LEMF 106, first LI network entity 107, second LI network entity 108 and third LI network entity 301. It will be appreciated that these entities may be similar to the like numbered entities in the foregoing.

The NAF 102 may receive trigger information from the first LI network entity 107. This may be via an $X1_{13}$ 1 interface between the first LI network entity 107 and the NAF 102. Similarly to the above embodiments, the NAF 102 may provide and IRI report relating to security information to the second LI network entity 108, for example via an X2 interface between the NAF 102 and the second LI network entity 108. The NAF 102 may also generate and IRI report relating to intercepted information and send it to the third LI network entity 301.

In response to the IRI report or other indication from the NAF 102, the second LI network entity 108 may trigger the generation of an IRI report in the BSF 103 by sending the BSF a request or trigger information over an interface between the BSF 103 and the second LI network entity 108. The BSF 103 may generate and send an IRI report corresponding to the security information.

FIG. 8 shows the method steps that may be carried out in accordance with this embodiment.

At step 801, the NAF 102 may receive trigger information from the first LI network entity 107. The NAF 102 may generate an IRI report in response to the receipt of the trigger information and send the IRI report to the second LI network entity 108 at step 802.

In some embodiments, the IRI report may include security information from the NAF 102. In other embodiments, the report may comprise information to prompt the second LI network entity 108 to request security information from the BSF 103. An IRI report from the NAF 102 containing security information may act as a prompt for the BSF 103 to request security information from the BSF 103.

At step 803, the second LI network entity 803 requests security information from the BSF 103. The request may be in the form of trigger information identifying for example the UE 101 and/or service for which the security information is requested. The request may be made via the Xgba interface between the BSF 103 and the second LI network entity 108.

In response to the request from the second LI network entity 108, the BSF 103 may generate an IRI report including the requested information at step 804.

At step 805, the NAF 102 may intercept data communication between the UE 101 and the NAF 102 and generate an IRI report corresponding to the intercepted information.

In embodiments, lawful interception may be directly activated in the NAF 102 from the first LI network entity. In one embodiment, the NAF 102 may requests GBA keys for the communication from the BSF 103 and then provide these keys along with application specific details to the second LI network entity 108 in response to the trigger information. The second LI network entity may then deliver the encryption parameters to the intercepting law enforcement agency, for example via the LEMF 106. The NAF 102 may also intercept the communication if that is under control of NAF.

Alternatively to the NAF 102 providing the security information, the NAF 102 may provide the trigger information to the second LI network entity 102 and based on that information the second LI network entity may query the BSF 103 about the NAF specific security information. In this embodiment, and interface between the second LI network entity 108 and the BSF 103 is provided. In this embodiment, the NAF 102 and BSF 103 may be in the same network operator domain.

While the NAF 102 and the BSF 103 have been both describes as generating IRI reports relating to security information, it will be appreciated that in some embodiments the content of these reports may differ. For example the BSF 103 may provide security keys used in the communication between a UE 101 and NAF 102, while the NAF 102 may provide application specific data pertaining to the application which the NAF 102 provides. In some embodiments, it will be determined whether it is necessary for both the NAF 102 and the BSF 103 to provide security information. In some embodiments, only one of these entities will provide the security information.

While, in the foregoing, the first, second and third LI network entities have been described as separate network entities, it will be appreciated that they may form different functions of a single network entity in some embodiments.

It will further be appreciated that the first, second and third network entities may further be provided as part of an existing network entity. It is also noted herein that while the above describes exemplifying embodiments, there are several variations and modifications which may be made to the disclosed solution without departing from the scope of the present invention.

In general, the various embodiments may be implemented in hardware or special purpose circuits, software, logic or any combination thereof. Some aspects of the embodiments may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some embodiments may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

Furthermore while some embodiments may have been described with entities associated with specific network implementation, for example in accordance with a 3G 3PP network, it will be appreciated that embodiments may be implemented in other networks and by network entities not restricted by a specific network implementation.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed, there is a further embodiment comprising a combination of one or more of any of the other embodiments previously discussed.

The invention claimed is:

1. A method for providing security information associated with lawful interception of communication data of a user equipment, comprising:
receiving, at a bootstrapping server function, information associated with the lawful interception of the communication data of the user equipment, the communication data being secured in accordance with a generic bootstrapping architecture, the received information including an identity of the user equipment, and the received information further identifying the communication data to be intercepted by a lawful interception entity by at least indicating a type of Internet Protocol based service comprising the communication data to be intercepted;
receiving, at the bootstrapping server function and from the user equipment, a request to generate security information for encrypting the communication data between the user equipment and a network application function, the network application function providing the type of Internet Protocol based service comprising the communication data to be intercepted; and
in response to receiving the request:
generating, by the bootstrapping server function, the security information associated with the communication data of the user equipment, and the security information comprising a first secret shared between the network application function and the user equipment; and
providing, by the bootstrapping server function and to the lawful interception entity, the security information, the providing of the security information enabling the lawful interception entity to decrypt intercepted communication data between the user equipment and the network application function.

2. The method of claim 1, wherein the security information further comprises a second secret shared between the bootstrapping server function and the user equipment, the second secret being based at least on the first secret.

3. The method of claim 2, wherein the second secret comprises a key for encrypting the communication data between the user equipment and the network application function.

4. The method of claim 3, wherein the key comprises a symmetric key and/or an application specific key.

5. The method of claim 1, wherein the received information further identifies the communication data to be intercepted by at least providing an identity of the network application function.

6. The method of claim 1, wherein the providing of security information comprises:
generating an interception related information report comprising the security information; and
sending, to the lawful interception entity, the interception related information report, the sending of the interception related information report enabling an interception of the communication data that is to be intercepted by at least enabling the lawful interception entity to decrypt the intercepted communication data between the user equipment and the network application function.

7. The method of claim 1, wherein the Internet Protocol based service comprises a voice service and/or a video service.

8. An apparatus for providing security information associated with lawful interception of communication data of a user equipment, comprising:
at least one processor; and
at least one memory including program code which when executed by the at least one processor causes the apparatus to at least:
receive information associated with the lawful interception of the communication data of the user equipment, the communication data being secured in accordance with a generic bootstrapping architecture, the received information including an identity of the user equipment, and the received information identifying the communication data to be intercepted by a lawful interception entity by at least indicating a type of Internet Protocol based service comprising the communication data to be intercepted;

receive, from the user equipment, a request to generate security information for encrypting the communication data between the user equipment and a network application function, the network application function providing the type of Internet Protocol based service comprising the communication data to be intercepted; and in response to receiving the request:
generate the security information associated with the communication data of the user equipment, and the security information comprising a first secret shared between the network application function and the user equipment; and provide, to the lawful interception entity, the security information, the providing of the security information enabling the lawful interception entity to decrypt intercepted communication data between the user equipment and the network application function.

9. The apparatus of claim 8, wherein the security information further comprises a second secret shared between the bootstrapping server function and the user equipment, the second secret being based at least on the first secret.

10. The apparatus of claim 9, wherein the second secret comprises a key for encrypting the communication data between the user equipment and the network application function.

11. The apparatus of claim 10, wherein the key comprises a symmetric key and/or an application specific key.

12. The apparatus of claim 8, wherein the received information further identifies the communication data to be intercepted by at least providing an identity of the network application function.

13. The apparatus of claim 8, wherein the apparatus is further caused to at least provide the security information by at least:

generating an interception related information report comprising the security information; and sending, to the lawful interception entity, the interception related information report, the sending of the interception related information report enabling an interception of the communication data that is to be intercepted by at least enabling the lawful interception entity to decrypt the intercepted communication data between the user equipment and the network application function.

14. A non-transitory computer-readable storage medium including program code which when executed by at least one processor causes operations for providing security information associated with lawful interception of communication data of a user equipment, the operations comprising:

receiving, at a bootstrapping server function, information associated with the lawful interception of the communication data of the user equipment, the communication data being secured in accordance with a generic bootstrapping architecture, the received information including an identity of the user equipment, and the received information further identifying the communication data to be intercepted by a lawful interception entity by at least indicating a type of Internet Protocol based service comprising the communication data to be intercepted;

receiving, at the bootstrapping server function and from the user equipment, a request to generate security information for encrypting the communication data between the user equipment and a network application function, the network application function providing the type of Internet Protocol based service comprising the communication data to be intercepted; and in response to receiving the request:
generating, by the bootstrapping server function, the security information associated with the communication data of the user equipment, and the security information comprising a first secret shared between the network application function and the user equipment; and providing, by the bootstrapping server function and to the lawful interception entity, the security information, the providing of the security information enabling the lawful interception entity to decrypt intercepted communication data between the user equipment and the network application function.

15. The non-transitory computer-readable storage medium of claim 14, wherein the security information further comprises a second secret shared between the bootstrapping server function and the user equipment, the second secret being based at least on the first secret.

16. The non-transitory computer-readable storage medium of claim 15, wherein the second secret comprises a key for encrypting the communication data between the user equipment and the network application function.

17. The non-transitory computer-readable storage medium of claim 16, wherein the key comprises a symmetric key and/or an application specific key.

* * * * *